March 14, 1961     R. A. BLOOMQUIST     2,974,630
DOOR-KNOCKER
Filed Dec. 28, 1959
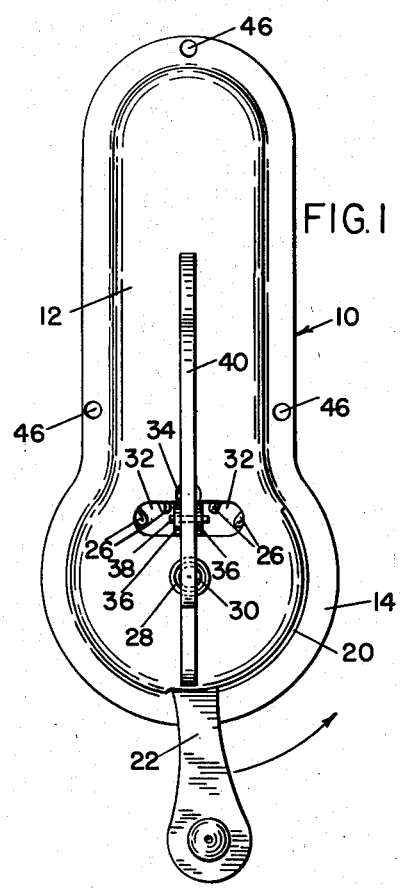
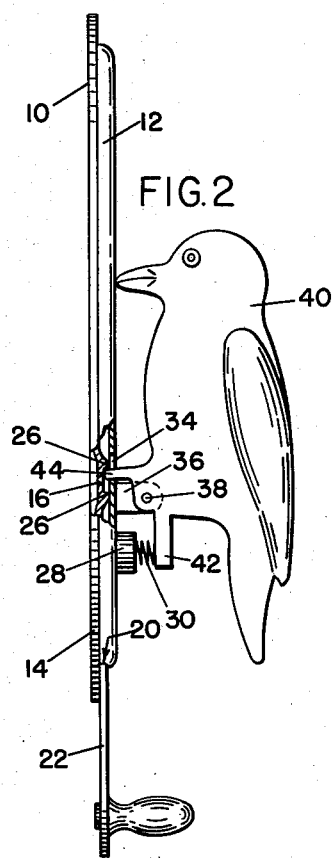
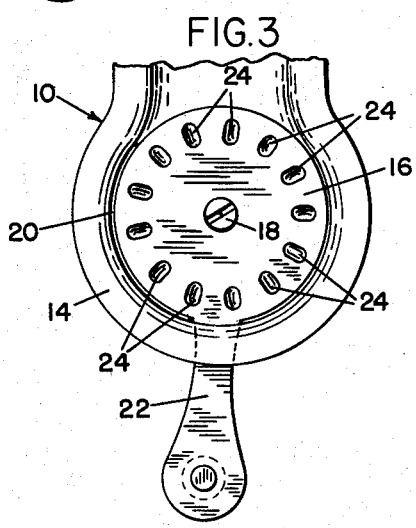
INVENTOR
RUDOLPH A. BLOOMQUIST
ATTORNEY

United States Patent Office 2,974,630
Patented Mar. 14, 1961

2,974,630
DOOR-KNOCKER
Rudolph A. Bloomquist, 203 Southbridge St., Auburn, Mass.
Filed Dec. 28, 1959, Ser. No. 862,182
1 Claim. (Cl. 116—148)

This invention relates to a new and improved door-knocker, and the principal object of the invention is to provide a representation of a bird such as a woodpecker which is mounted on a plate to be actuated to cause the beak of the bird to rapidly make a tattoo on the plate.

Further objects of the invention include the provision of a simplified door-knocker construction of the class described which is easier to make, particularly of stampings, which is easily assembled, and in which the actuating mechanism is simpler and more easily actuated.

A further object of the invention resides in the provision of a bird-type door-knocker as above stated including a base, a pivot on the base, a flat plate in the general outline of a bird mounted to pivot thereon in such a way as to allow the beak of the bird to beat on the plate and including mechanism for causing this actuation, said mechanism comprising a flat plate having a circular series of indentations thereon, said flat plate being rotatably mounted on the base plate underneath the same in concealed condition on an axis at right angles to the bird axis, and including an actuating lever by which the user is enabled to oscillate the plate, the indentations impinging upon a foot for the bird, and including a spring which actuates the bird towards the knocking position, the indentations on the circular plate retracting the bird against the action of the spring; once an indentation has passed the aforementioned foot, the bird is suddenly released under actuation of the spring to cause the sounding action.

The invention further relates to arrangements and combinations of parts which will be hereinafter described and more particularly set forth in the appended claim.

Reference is to be had to the accompanying drawings, in which

Fig. 1 is a view in front elevation illustrating the invention;

Fig. 2 is a view in side elevation thereof, parts being broken away; and

Fig. 3 is a view in rear elevation of the lower part of the device showing the actuating means.

In carrying out the invention, I provide a base plate generally indicated at 10. I prefer to raise the central portion of said base plate at 12 to form a better sounding-board and also to conceal certain of the actuating mechanism of the device. As shown in Fig. 1, the base plate 12 is relatively pear-shaped having an enlarged substantially circular portion at the lower end thereof as at 14 and it will be seen that the raised portion 12 follows the same contour.

This provides a hollow at the rear of the plate and in the hollow portion at the lower end of the plate in the circular part there is provided a circular plate 16 rotatable on any kind of a stud as at 18. There is an arcuate slot at 20 through which extends a handle 22, the handle 22 being integral with or connected to plate 16. Plate 16 is provided with a circular series of indentations 24 which appear as projections as shown at 26, see Fig. 2.

The pivot-pin at 18 is utilized to secure a bushing 28 at the forward face of the base plate 10 in the center of the circular portion 14, and this conveniently receives a coil spring 30 for a purpose to be described. The plate 10 is also provided with a three-part cut-out at 32, 32, 34 and the cut-out portions 32 provide for upwardly extending spaced ears 36 carrying a pin 38 which extends through the body of the bird 40.

The body of the bird as seen in Fig. 2 is shaped in the general nature of a woodpecker or the like, but as clearly shown in Fig. 1, it is merely a flat plate stamped out to the desired configuration and ears 36, 36 extend at the sides thereof as clearly shown in Fig. 1 to mount the bird in pivoted relation. The bird figure is provided with a rearward extension in the same plane thereof at 42 for bearing on spring 30. This causes the bird beak to be normally held against the plate 12. It will be seen that the spring 30 urges the bird figure in the counterclockwise direction in Fig. 2.

The bird is provided with a foot 44 which extends through the aperture 34 and is aligned with the circular series of projections 26. The spring 30 pushes the bird figure in a direction so that the foot 44 normally impinges upon the plate 16. When the handle 22 is actuated in the direction of the arrows in Fig. 1, the projections 26 will cause retraction of the bird in a clockwise direction, but when any particular projection 26 has passed the bird foot 44, then of course the entire figure of the bird is released and the spring 30 causes it to snap in the desired direction and beat its beak upon the part 12 of the base 10 which acts as a sounding-box.

When the plate is mounted upon a door by means of fasteners which may extend through holes 46 or other means, a brisk and loud tattoo is imparted and the sound-box effect occasioned by the raised portion 12 of the base is extremely effective.

Having thus described my invention and the advantages thereof, I do not wish to be limited to the details herein disclosed, otherwise than as set forth in the claim, but what I claim is:

A door knocker comprising an elongated base plate having a generally rectangular portion extending from one end and terminating at the opposite end in a generally circular portion, the major part of said rectangular portion and said circular portion being dished forwardly to provide a marginal flange and a rearwardly opening recess having a generally rectangular portion communicating with a generally circular portion, a knocker member simulating a bird and having a head, beak and tail portion, means between said head and tail portions pivotally mounting said member on said plate for movement of said beak into and out of engagement with the rectangular portion of said plate, resilient means for urging said beak into engagement with said plate, said plate having an aperture communicating with the circular portion of said recess between said pivotal mounting means and said beak, an actuating disk rotatably mounted in the circular portion of said recess, an arcuate series of protuberances on said disk in alignment with said aperture, a leg on said knocker member extending through said aperture and terminating in the path of movement of said protuberances, said circular portion having a slot communicating with the circular portion of said recess, and a handle on said disk extending through said slot, whereby upon operation of said handle to rotate said disk, said protuberances will successively engage said leg to intermittently move said beak away from said plate, said resilient means intermittently moving said beak into engagement with said plate to provide a knocking action.

References Cited in the file of this patent
UNITED STATES PATENTS

| 1,035,745 | Rubes | Aug. 13, 1912 |
| 1,169,837 | Koch | Feb. 1, 1916 |
| 2,046,868 | Burke | July 7, 1936 |

FOREIGN PATENTS

| 465,208 | Canada | May 16, 1950 |